3,764,314
ELECTROPHOTOGRAPHIC COMPOSITION OF A POLY-N-VINYLCARBAZOLE AND A DIMETHYL-NAPHTHALENE

Tetsuo Tanaka, Akio Kojima, and Takamichi Enomoto, Tokyo, Japan, assignors to Ricoh Co. Ltd., Tokyo, Japan
No Drawing. Filed Apr. 19, 1972, Ser. No. 245,629
Claims priority, application Japan, Apr. 19, 1971, 46/24,503
Int. Cl. G03g 5/06
U.S. Cl. 96—1.5
14 Claims

ABSTRACT OF THE DISCLOSURE

Films especially for use in electrophotography which comprise poly-N-vinylcarbazole, nuclear substituted derivatives thereof, and their mixtures together with at least one member selected from the group consisting of 1,2-dimethylnaphthalene, 1,4 - dimethylnaphthalene and 1,6-dimethylnaphthalene.

BACKGROUND OF INVENTION

This invention relates to films of poly-N-vinylcarbazole, nuclear substituted derivatives thereof and mixtures of these compounds. The films are especially useful in electrophotography due to the photoconductive and photosensitive properties of the compounds.

Poly-N-vinylcarbazole and nuclear substituted derivatives thereof, especially halogen, nitrogen, amino and nitroso substituted derivatives are known to form transparent photosensitive films which are useful in electrophotography and for other purposes. The films, however, are not totally satisfactory because of their limited flexibility and extensibility. As a result, when they are deposited on the surfaces of various substances such as metal, glass, polymer or paper to produce useful products they tend to crack or to peel away from the substrate.

Various proposals have been made for correcting these defects. For example, the disclosure of Japanese patent publication 17,188/66 suggests the use of para terphenyl. These products, however, while satisfactory for some uses, have a pressure sensitive adhesive quality so that when they are stacked in piles they tend to block or stick together.

The use of epoxy resins derived from fatty acid chlorides to improve flexibility is suggested in Japanese patent publication 29,433/68. The additive, however, reduces the electrical surface potential of the film so that the images produced are not completely satisfactory.

THE INVENTION

It has now been discovered that the disadvantages inherent in previously known products can be substantially alleviated by incorporating selected amounts of dimethylnaphthalenes in the poly-N-vinylcarbazole films. More specifically, it has been found that the addition of at least one dimehtylnaphthalene selected from the group consisting of 1,2 - dimethylnaphthalene, 1,4 - dimethylnaphalene, and 1,6-dimethylnaphthalene makes possible the production of flexible, stretchable films which do not crack, peel off or block. Moreover, the films are capable of developing an increased surface potential so that when used in electrophotography it is possible to obtain highly concentrated images.

Poly-N-vinylcarbazoles utilized in this invention are generally solid at room temperature, have a molecular weight of from about 200,000 to 300,000 and may be represented by the formula:

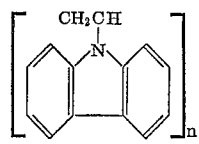

where $n$ is a high integer. The most useful substituted derivatives are those substituted at the 3 and/or 6 position with halogen, nitro, nitroso, amino or azophenyl groups.

The dimethylnaphthalenes used in the invention are liquid at room temperature, have a molecular weight of 156, are miscible with the poly-N-vinylcarbazoles and are capable of maintaining a uniform charge.

Both the film formers and the additives are soluble in organic solvents, especially relatively volatile, polar organic solvents containing up to about seven carbon atoms. Hydrocarbons such as toluene and halogen substituted hydrocarbons, especially chloroform, methylene chloride, chlorobenzene and ethylene chloride are useful.

For most purposes compositions containing from about 5 to 100 parts by weight of additive for each 100 parts by weight of the poly-N-vinylcarbazole will be employed. Generally, from the point of view of useful results at reasonable economy, the preferred range is from 25 to 50 parts per 100 parts. If appreciably less than 5 parts are employed the improvements are less apparent, and if more than 100 parts are used the films tend to soften.

For many commercial purposes the compositions of the invention will be provided in solutions, suitably at concentrations of from about 3 to 10 percent, preferably 4 to 7 percent. The solutions will be utilized in the standard manner to produce supported or unsupported film from about 5 to 25µ in thickness The compositions of this invention are especially useful in the production of electrophotographic elements of the class in which a thin photoconductive layer is formed on an electrically conductive substrate, typically a metallic substrate such as aluminum, magnesium or zinc or a paper substrate, either cellulosic or the newly available synthetic papers formed from plastic films, coated plastic films, or polymeric fibrils. The paper substrate will normally be processed for conductivity. A special advantage of the products of this invention is that the high initial surface potential of the film is maintained even under conditions of high temperature and humidity.

The electrophotographic elements are utilized following the standard procedure for the formation of images using electrostatic techniques based on photoconductive substances such as zinc oxide, selenium or organic photoconductors. The steps are: (1) formation of electric charge, (2) selective leaking of the charge by exposure to light which may be reflected from the image to be reproduced to form the so-called latent electrostatic image, (3) deposition of toner on the latent image to form the toner image and (4) fusion or transfer of the toner image.

Although the compositions of the invention are particularly useful for the preparation of photoconductive films, and have been principally described for this purpose, the properties of the films, especially their high transparency, flexibility, stretchability and toughness makes them useful for other purposes. They are, for example, useful as films for general photography, for the production of secondary originals in diazo copying, for X-ray photography, and as films for overhead projectors.

The following non-limiting examples are given by way of illustration only.

EXAMPLES 1-13

The solutions described below were deposited on a polyester ribbon which supported a thin conductive layer of copper iodide to form films about 10 microns thick. The sensitivity of the film was enhanced by including about 0.2% by weight of crystal violet, based on the solids content of the solution. The molecular weight of the poly-N-vinylcarbazole component is about 400,000.

TABLE 1

| | Principal component | Additive |
|---|---|---|
| Comparative examples: | | |
| 1 | Poly-N-vinylcarbozole (5% solution in monochlorobenzene), 1,000 g. | None. |
| 2 | do | P-terphenyl (Kanechlor 500), 15 g. |
| 3 | do | P-terphenyl (Kanechlor 500), 25 g. |
| 4 | do | Epoxide resin (a manufacture of Shell Oil Co.; trade name: Epicoat 828, 15 g. |
| 5 | do | Epoxide resin (a manufacture of Shell Oil Co.; trade name: Epicoat 828, 25 g. |
| 6 | do | Fatty acid chloride (Adeka Argus, Adekacizer), 15 g. |
| 7 | do | Fatty acid chloride (Adeka Argus, Adekacizer), 25 g. |
| Examples containing compositions of this invention: | | |
| 8 | do | 1,2-dimethylnaphthalene, 15 g. |
| 9 | do | 1,2-dimethylnaphthalene, 25 g. |
| 10 | do | 1,4-dimethylnaphthalene, 15 g. |
| 11 | do | 1,4-dimethylnaphthalene, 25 g. |
| 12 | Poly-N-3-chlorovinyl carbazole (5% solution of monochlorobenzene, 1,000 g. | 1,2-dimethylnaphthalene, 15 g. |
| 13 | do | 1,2-dimethylnaphthalene, 25 g. |

Next, a variety of transparent samples (that is, photosensitive substances in the form of film) thus obtained were measured for their surface electric potential, blocking effect, etc. The results are shown in the following Table 2. As is clear from this table, the products of the present invention, as will be seen, exhibit enhanced flexibility as well as increased surface electric potential as compared with conventional substances. They also have superior properties with respect to blocking, image concentration, etc.

The electrostatic properties were measured by effecting luminous attenuation utilizing a tungsten-filament lamp with an illumination of 20 lux at the surface of the sample subsequent to applying 6 kv. negative corona discharge.

TABLE 2

| | Condition after 1 month preservation | Surface electric potential [1] | | Exposure required for half decay [2] (Lux sec.) | Blocking [3] | Concentration of image [4] |
|---|---|---|---|---|---|---|
| | | 20° C., humidity 40% | 30° C., humidity 80% | | | |
| Comparative examples: | | | | | | |
| 1 | Cracks occur | 650 | 530 | 170 | None | 0.61 |
| 2 | Good | 630 | 500 | 178 | A little | 0.60 |
| 3 | do | 620 | 500 | 184 | Much | 0.60 |
| 4 | do | 500 | 440 | 178 | None | 0.55 |
| 5 | do | 460 | 410 | 184 | A little | 0.51 |
| 6 | do | 540 | 510 | 178 | None | 0.58 |
| 7 | do | 520 | 430 | 184 | A little | 0.58 |
| Examples under present invention: | | | | | | |
| 8 | do | 820 | 790 | 178 | None | 0.72 |
| 9 | do | 800 | 760 | 184 | do | 0.72 |
| 10 | do | 880 | 790 | 178 | do | 0.74 |
| 11 | do | 850 | 780 | 184 | do | 0.73 |
| 12 | do | 870 | 770 | 150 | do | 0.74 |
| 13 | do | 840 | 760 | 150 | A little | 0.72 |

[1] Electric potential 15 seconds after being left standing subsequent to applying 6 kv. negative corona discharge for 30 seconds.
[2] Amount of exposure required until the surface electric potential decayed to half its initial value.
[3] Degree of blocking arising from 24-hour preservation at 50° C. under a load of 100 g./cm.$^2$.
[4] Concentration of transmittance measured with Narumi densitometer subsequent to copying by means of the electronic copying press BS-220 manufactured by K. K. Richo.

What is claimed is:

1. A composition comprising poly-N-vinylcarbazole, nuclear substituted derivatives thereof, or mixtures of such poly-N-vinylcarbazoles having a molecular weight of from about 200,000 to 300,000 and, for each 100 parts by weight of such poly-N-vinylcarbazoles, from about 5 to 100 parts by weight of a dimethylnaphthalene selected from the group consisting of 1,2-dimethylnaphthalene, 1,4-dimethylnaphthalene and 1,6-dimethylnaphthalene dissolved in a volatile solvent.

2. A composition as in claim 1 wherein the nuclear substituent is a member selected from the group consisting of nitro, amino, nitroso, azophenyl and halogen.

3. A composition as in claim 1 containing from 25 to 50 parts by weight of dimethylnaphthalene for each 100 parts by weight of poly-N-vinylcarbazole.

4. A film comprising poly-N-vinylcarbazole, nuclear substituted derivatives thereof, or mixtures of such poly-N-vinylcarbazoles having a molecular weight of from about 200,000 to 300,000 and, for each 100 parts by weight of such poly-N-vinylcarbazoles, from about 5 to 100 parts by weight of a dimethylnaphthalene selected from the group consisting of 1,2-dimethylnaphthalene, 1,4-dimethylnaphthalene and 1,6-dimethylnaphthalene.

5. A film as in claim 4 wherein the nuclear substituent is a member selected from the group consisting of nitro, amino, nitroso, azophenyl and halogen.

6. A film as in claim 4 containing from 25 to 50 parts by weight of dimethylnaphthalene for each 100 parts by weight of poly-N-vinylcarbazole.

7. An electrophotographic element comprising a conductive substrate coated on at least one surface with a film comprising poly-N-vinylcarbazole, nuclear substituted derivatives thereof, or mixtures of such poly-N-vinylcarbazoles having a molecular weight of from about 200,000 to 300,000 and, for each 100 parts by weight of such poly-N-vinylcarbazoles, from about 5 to 100 parts by weight of a dimethylnaphthalene selected from the group consisting of 1,2-dimethylnaphthalene, 1,4-dimethylnaphthalene and 1,6-dimethylnaphthalene.

8. An electrophotographic element as in claim 7 comprising poly-N-vinylcarbazole, nuclear substituted derivatives thereof, or mixtures of such poly-N-vinylcarbazoles having a molecular weight of from about 200,000 to 300,000 and, for each 100 parts by weight of such poly-N-vinylcarbazoles, from about 5 to 100 parts by weight of a dimethylnaphthalene selected from the group consisting of 1,2-dimethylnaphthalene, 1,4-dimethylnaphthalene and 1,6-dimethylnaphthalene.

9. An electrophotographic element as in claim 7 wherein the nuclear substituent is a member selected from the group consisting of nitro, amino, nitroso, azophenyl and halogen.

10. An electrophotographic element as in claim 7 containing from 25 to 50 parts by weight of dimethylnaphthalene for each 100 parts by weight of poly-N-vinylcarbazole.

11. An electrophotographic element as in claim 7 wherein the substrate is paper.

12. An electrophotographic element as in claim 11 wherein the paper is cellulosic.

13. An electrophotographic element as in claim 7 wherein the substrate is metallic.

14. An electrophotographic element as in claim 13 wherein the metal is magnesium, aluminum or zinc.

References Cited

UNITED STATES PATENTS

| 3,037,861 | 6/1962 | Hoegl et al. | 96—1 |
| 3,232,755 | 2/1966 | Hoegl et al. | 96—1 |
| 3,281,240 | 10/1966 | Cassiers | 96—1 |

GEORGE F. LESMES, Primary Examiner

M. B. WITTENBERG, Assistant Examiner

U.S. Cl. X.R.

252—501